United States Patent
Weiss et al.

(10) Patent No.: US 8,973,618 B2
(45) Date of Patent: Mar. 10, 2015

(54) STRETCHABLE STRIPWOUND HOSE

(75) Inventors: Matthias Weiss, Hilchenbach (DE);
Karl-Heinz Münker, Hilchenbach (DE);
Dietmar Baumhoff, Olpe (DE);
Andreas Gerhard, Wenden (DE);
Karsten Schenk, Schwalmstadt (DE);
Michael Henkelmann, Hilchenbach
(DE); Oliver Selter, Finnentrop (DE);
Stefan Hauk, Hilchenbach (DE)

(73) Assignee: WESTFALIA Metallschlauchtechnik GmbH & Co. KG, Hilchenbach (DE)

( * ) Notice: Subject to any disclaimer, the term of this patent is extended or adjusted under 35 U.S.C. 154(b) by 1106 days.

(21) Appl. No.: 12/889,592

(22) Filed: Sep. 24, 2010

(65) Prior Publication Data

US 2011/0232796 A1 Sep. 29, 2011

(30) Foreign Application Priority Data

Sep. 25, 2009 (DE) .................. 10 2009 042 755

(51) Int. Cl.
*F16L 11/00* (2006.01)
*F16L 11/16* (2006.01)
*F01N 13/18* (2010.01)

(52) U.S. Cl.
CPC ............ *F16L 11/16* (2013.01); *F01N 13/1816* (2013.01); *F01N 2530/26* (2013.01)
USPC .......................................... 138/135; 138/154

(58) Field of Classification Search
USPC ................................... 138/135, 154
See application file for complete search history.

(56) References Cited

U.S. PATENT DOCUMENTS

| 2,132,189 | A | | 10/1938 | Roemer | |
|---|---|---|---|---|---|
| 3,041,855 | A | * | 7/1962 | Hanlein | 63/5.1 |
| 3,204,666 | A | * | 9/1965 | Lindsay et al. | 138/135 |
| 3,442,297 | A | * | 5/1969 | George | 138/122 |
| 4,197,728 | A | * | 4/1980 | McGowen | 72/49 |
| 5,036,690 | A | * | 8/1991 | McGowen et al. | 72/49 |
| 6,311,736 | B2 | * | 11/2001 | Herman et al. | 138/135 |
| 6,488,052 | B2 | * | 12/2002 | Hupertz et al. | 138/135 |
| 6,543,488 | B2 | * | 4/2003 | Foti et al. | 138/135 |
| 6,612,342 | B2 | * | 9/2003 | Godel et al. | 138/118 |
| 2001/0015233 | A1 | * | 8/2001 | Herman et al. | 138/135 |
| 2002/0117227 | A1 | * | 8/2002 | Thomas et al. | 138/135 |
| 2005/0011573 | A1 | | 1/2005 | Chahine | |

FOREIGN PATENT DOCUMENTS

| DE | 34 41 064 A1 | 5/1986 |
|---|---|---|
| DE | 38 09 210 C1 | 2/1989 |
| DE | 42 30 278 A1 | 3/1994 |
| DE | 101 13 180 A1 | 10/2002 |
| DE | 102007016784 A1 | 10/2008 |
| EP | 1 245 886 A2 | 10/2002 |

* cited by examiner

*Primary Examiner* — James Hook
(74) *Attorney, Agent, or Firm* — Henry M. Feiereisen LLC

(57) ABSTRACT

A stripwound hose expandable from a compressed state to a stretched state includes at least two spiral-wound strips having at least three telescoping portions in a direction of a longitudinal axis. The telescoping portions are arranged in axially overlapping relation, when the stripwound hose assumes the compressed state; and extend in axial side-by-side relation, when the stripwound hose assumes the stretched state. The telescoping portions are hooked to one another when being axially stretched.

20 Claims, 9 Drawing Sheets

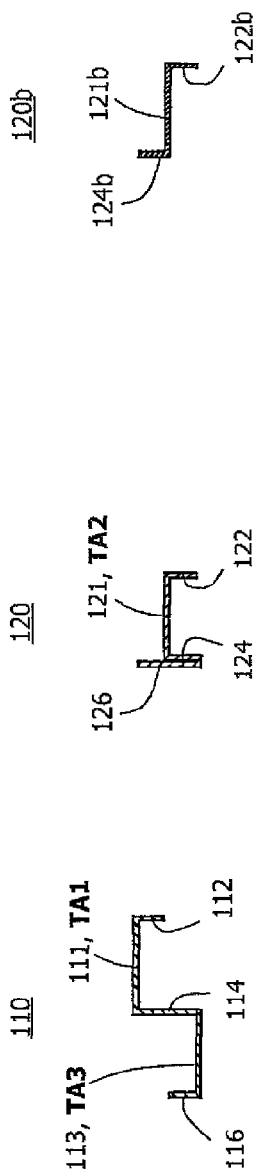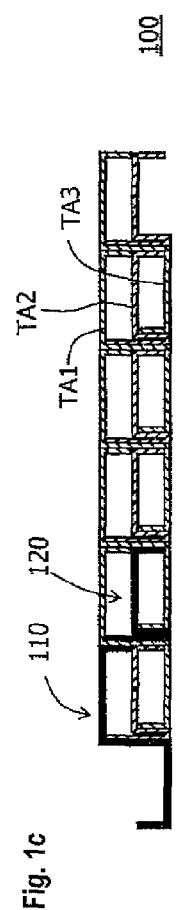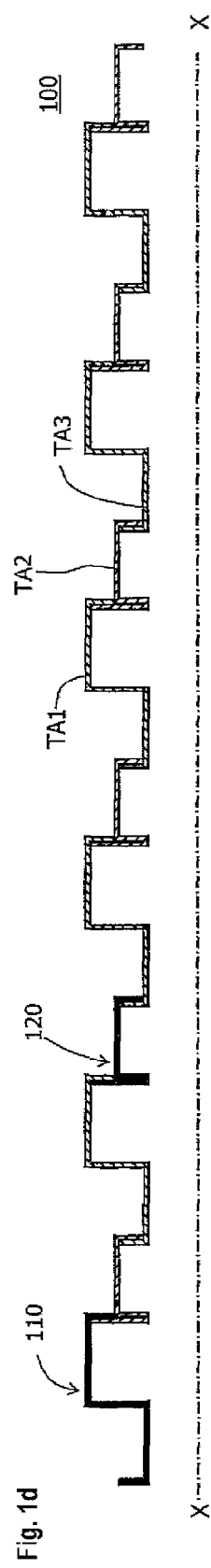

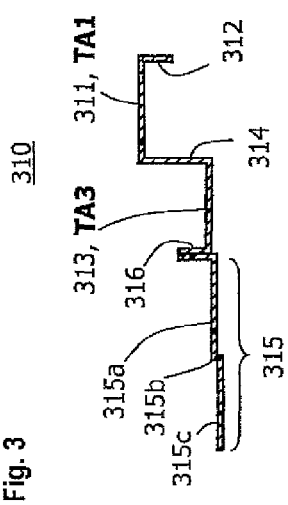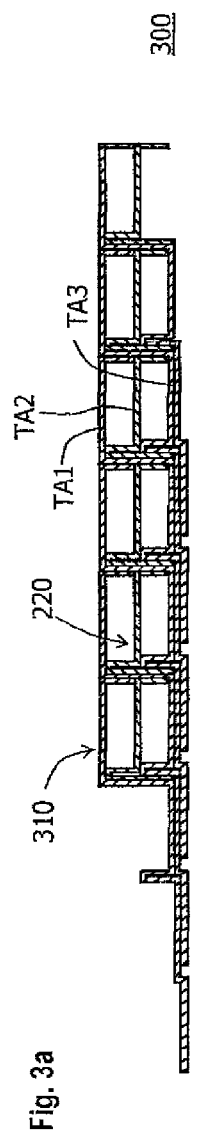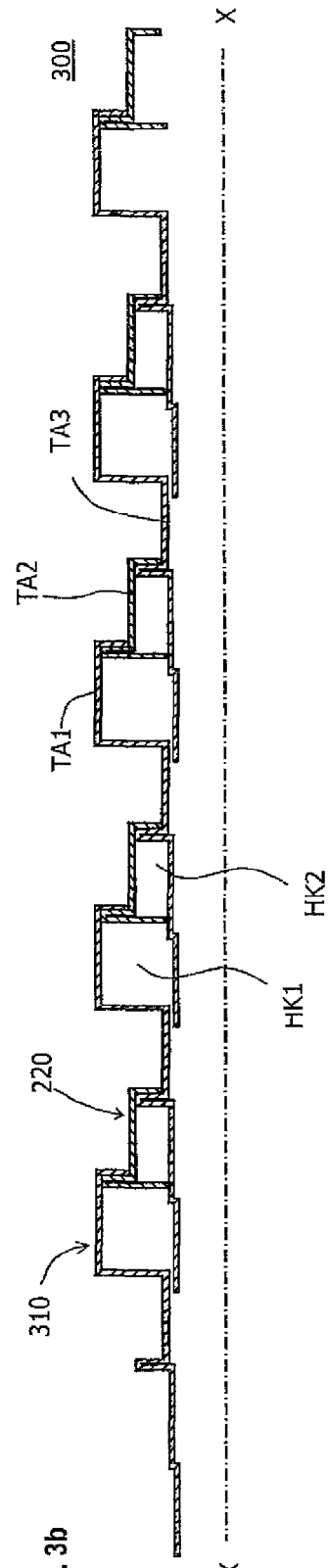

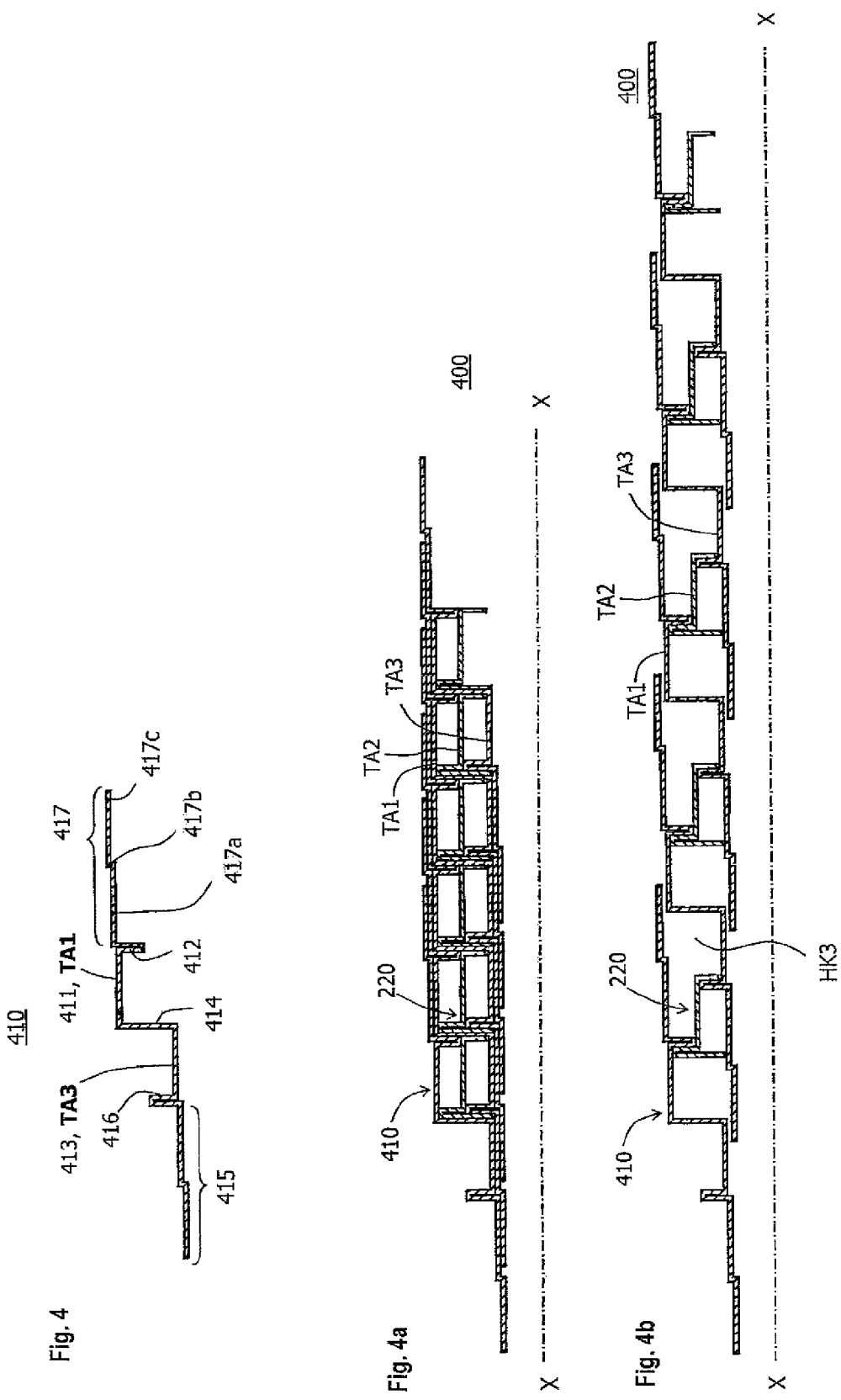

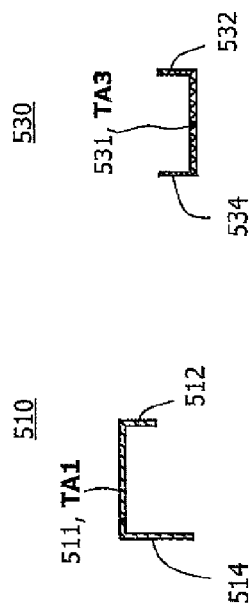
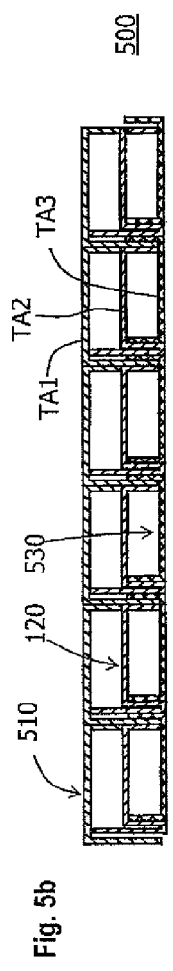
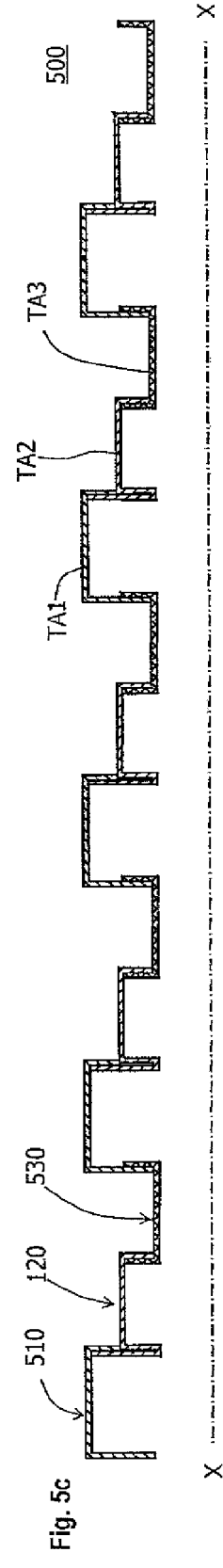
Fig. 5

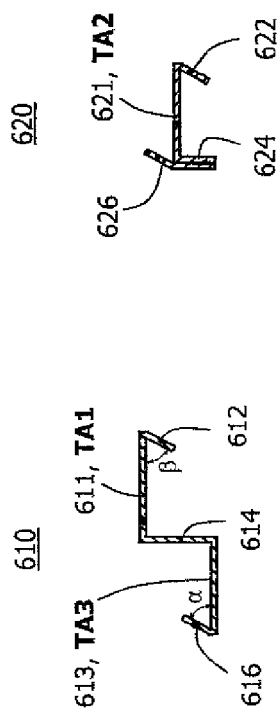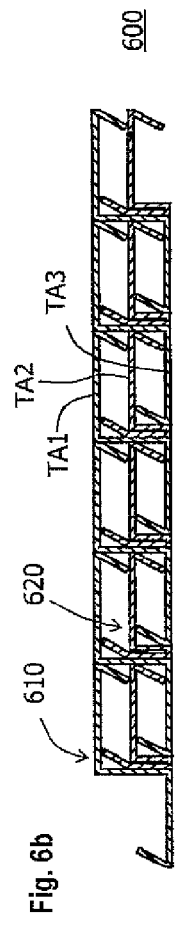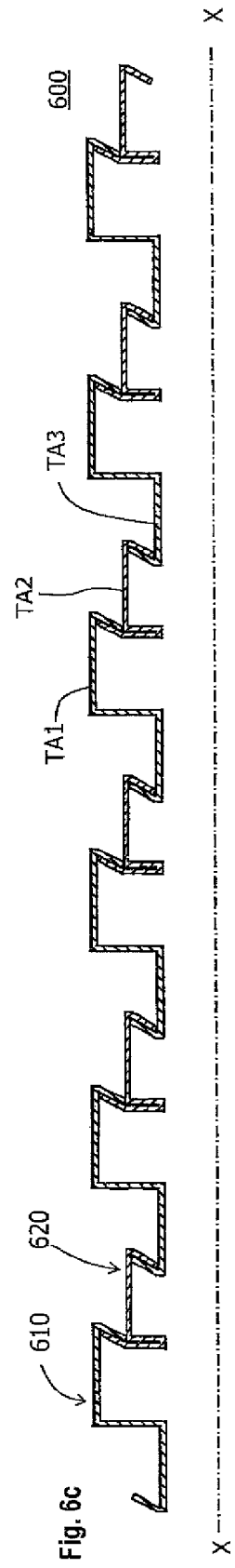

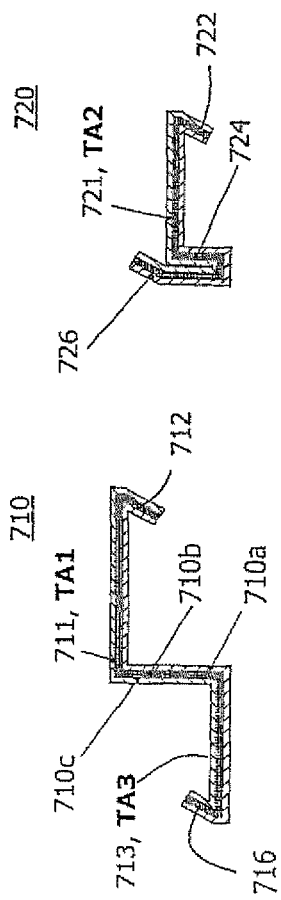
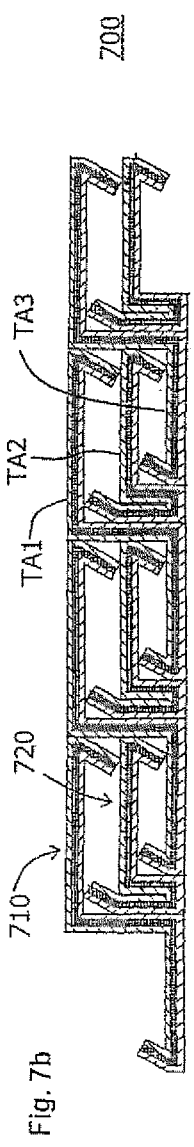
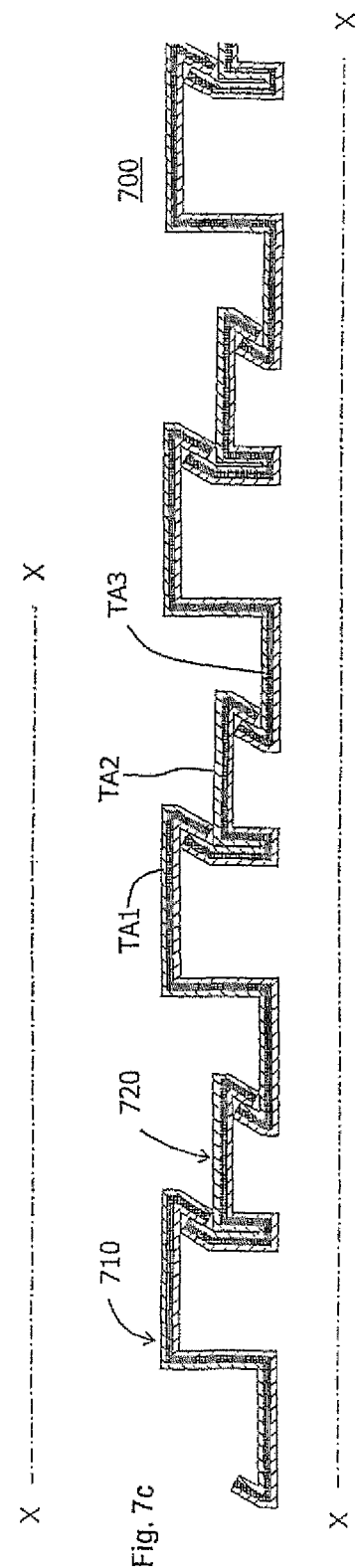

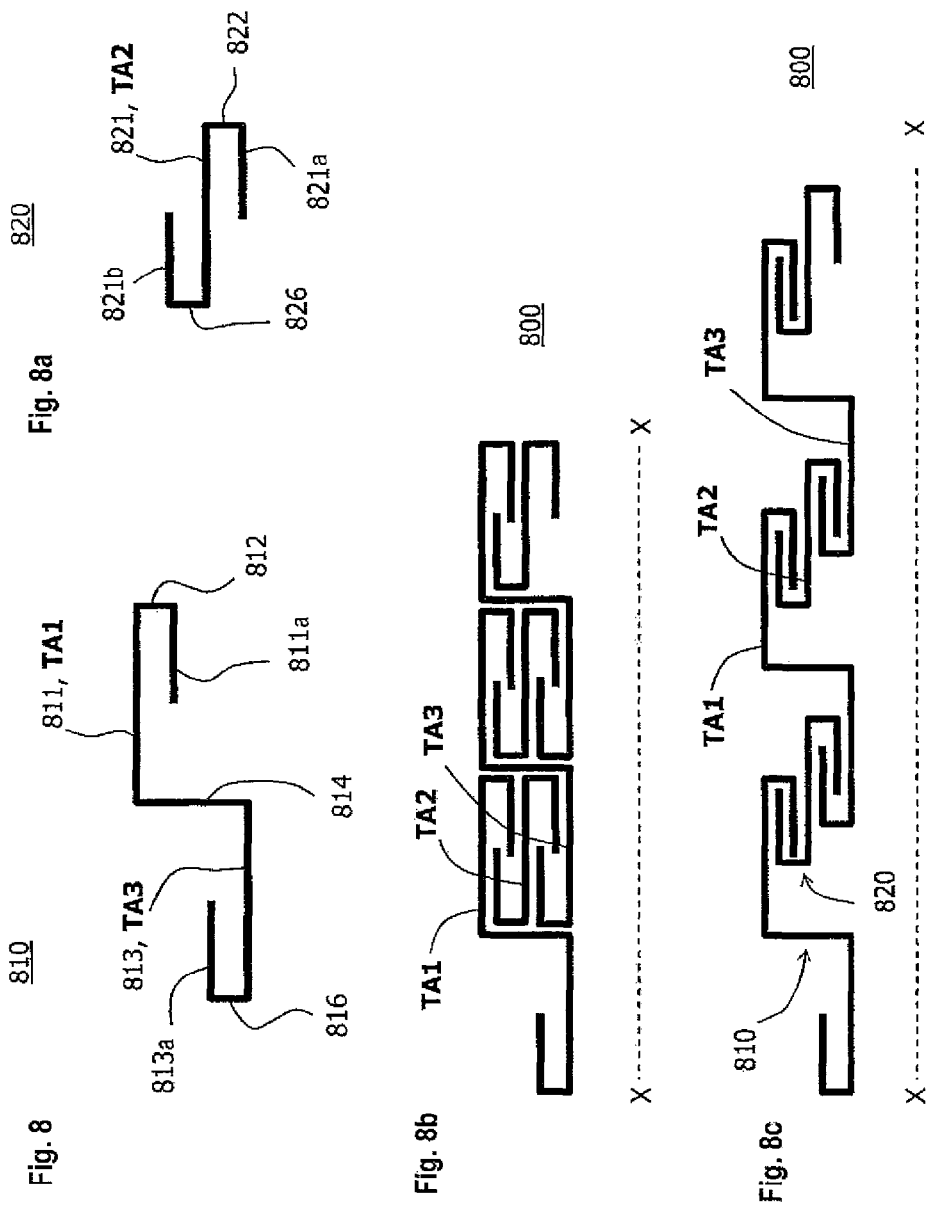

STRETCHABLE STRIPWOUND HOSE

CROSS-REFERENCES TO RELATED APPLICATIONS

This application claims the priority of German Patent Application, Serial No. 10 2009 042 755.4, filed Sep. 25, 2009, pursuant to 35 U.S.C. 119(a)-(d), the content of which is incorporated herein by reference in its entirety as if fully set forth herein.

BACKGROUND OF THE INVENTION

The present invention relates to a stretchable stripwound hose, and to a rigid or flexible conduit including such a stripwound hose, especially for application in exhaust pipes of motor vehicles.

The following discussion of related art is provided to assist the reader in understanding the advantages of the invention, and is not to be construed as an admission that this related art is prior art to this invention.

Stripwound hoses are typically made of metal and oftentimes used in decoupling elements for exhaust systems of motor vehicles. For example, German Patent Document DE 10 2007 016 784 A1 describes a singly hooked stripwound hose which enables an axial stretch of up to 70%. By definition, the term stretch relates to the lengthening of the stripwound hose in percentage from a fully compressed state (length $L_{min}$) to the fully stretched state (length $L_{max}$), i.e. stretch=$(L_{max}-L_{min})/L_{min}$. The attainable stretch disclosed in this document is, however, still inadequate, especially in situations of encased curved conduits having tight radii of curvature.

Stripwound hoses are used as liners in particular in the automotive field, such as passenger cars or utility vehicles, for exhaust ducting in decoupling elements of exhaust systems. The stripwound hoses are installed in gastight metal bellows to avoid additional turbulence in the exhaust flow and to improve thermal and acoustic insulation properties of the decoupling element.

In utility vehicles, the stripwound hoses are frequently used separately and attached as decoupling element in exhaust systems in the absence of an enveloping metal bellows. In view of a slight but still admissible residual leakage, the need for a gastight casing is in many cases not required. An example of a metal hose used as decoupling element is the so-called agraffe hose. All conventional stripwound hoses are multilayered but generally made from a single metal strip that is initially flat.

As regulations worldwide with respect to emission of harmful substances will become more stringent in the future, exhaust systems are increasingly equipped with aftertreatment modules such as, e.g., soot particulate filters and SCR systems. The operativeness of aftertreatments of exhaust systems is dependent on the temperature of the exhaust undergoing the aftertreatment. This applies in the case of SCR systems for the catalytic reaction which should result in an almost complete reduction of nitrogen oxide shortly after startup. When a particulate filter is involved, passive regeneration can occur only when the minimum exhaust temperature is exceeded. The active regeneration, e.g. initiated through injection of unburnt diesel in the exhaust system, also works more efficient with increasing exhaust temperatures. As a result, there is a demand to minimize temperature losses of the exhaust during its flow from the turbocharger outlet to the after treatment.

This demand applies to all components of the exhaust pipe, including straight and curved pipe sections and in many cases a flexible conduit. All these components should ideally be thermally insulated. In the case of passenger cars, insulation is realized by so-called airgap insulation. In other words, the exhaust pipes disposed directly downstream of the engine up to the catalytic converter are double-walled. As an alternative, the placement of screening sheets onto a single-walled exhaust pipe has also been proposed.

In utility vehicles, flexible conduits are typically provided with airgap insulation. Rigid pipelines, especially bent pipes, on the other hand, are normally not double-walled because bending of double-walled pipe in the relevant diameter zone of 77 mm up to 140 mm is complicated and difficult. The reason being that the industrial standard requires in this diameter zone smallest bending radii of 1*D (bending radius=pipe diameter) so that in most cases only a single-walled pipe can be reliably used. As a consequence, insulations are normally manually applied after the exhaust ducting of utility vehicles has been finished through welding. Oftentimes, prefabricated insulation pads are wound about the pipes or E-glass fabrics are attached onto the straight and curved pipe section underneath a hermetically welded lining of thin, preformed metal sheets. This is complicated and goes against a standardization and industrialization of attaching thermal insulations. Standardization and industrialization are desired because in the future most of exhaust ducting between turbocharger outlet and entry into the aftertreatment has a thermal insulation.

A multilayer configuration and implementation of an airgap insulation can be realized by enclosing a rigid exhaust pipe with a stripwound hose. However, the bending radii of the curved pipes of up to 1*D (bending radius=pipe diameter) limits this application. Realization of such small bending radii cannot be attained with conventional agraffe-type stripwound hoses because of the stretch limitation of about 35%.

It would therefore be desirable and advantageous to provide an improved stripwound hose to obviate prior art shortcomings.

SUMMARY OF THE INVENTION

According to one aspect of the present invention, a stripwound hose expandable from a compressed state to a stretched state includes at least two spiral-wound strips having at least three telescoping portions in a direction of a longitudinal axis, with the telescoping portions arranged in axially overlapping relation, when the stripwound hose assumes the compressed state, and extending in axial side-by-side relation, when the stripwound hose assumes the stretched state, wherein the telescoping portions are hooked to one another when being axially stretched.

The present invention resolves prior art problems by configuring the stripwound hose from at least two spiral-wound strip, e.g. profiled metal strips. As viewed in longitudinal section (along the hose axis or rotation axis), the stripwound hose should hereby have at least three so-called "telescoping portions" which should satisfy the following conditions:

a. In the compressed state of the stripwound hose, the telescoping portions are arranged in axial superimposed relationship, i.e. the telescoping portions extend parallel to one another over the same axial distance.

b. In the stretched state of the stripwound hose, the telescoping portions are arranged axially next to one another. Typically, the telescoping portions are hereby arranged successively in axial direction in the absence of any axial gaps.

c. The telescoping portions are hooked to one another when undergoing an expansion in axial direction. The telescoping portions thus have (typically radially projecting) hooking elements which abut at particular stretches of the stripwound hose to thereby limit the possible minimum and/or maximum stretch of the stripwound hose. In the absence of such an interlock, the stripwound hose could be randomly pulled apart in axial direction and thus loose its wound integrity.

The presence of three or more telescoping portions enables virtually any desired expansion of the stripwound hose. The telescoping portions add only singly to the axial length of the stripwound hose, when the latter is compressed, because as a result of the telescoping arrangement, the telescoping portions extend in parallel relation in the same axial section. Only when the stripwound hose is stretched, the telescoping portions change from the axially superimposed disposition to the axially successive disposition so that each telescoping portion adds to the axial expansion of the stripwound hose. Employing a correspondingly great number of telescoping portions permits to stretch the stripwound hose virtually to any length.

In the most common case, the stripwound hose can have precisely three telescoping portions, although any number is, of course, conceivable. Advantageously, the stripwound hose is constructed identical over its entire axial length, i.e. having in longitudinal section a multiplicity of telescoping portions of which each (at least) three thereof are arranged to telescope. Typically, the configuration of the stripwound hose is periodic in axial direction.

According to another advantageous feature of the present invention, the two strips may have different cross sectional profiles. Typically, all strips are arranged consecutively in axial direction and wound together, i.e. all different strips are arranged as wide "multi-strip" side-by-side, and this "multi-strip" is wound to a hose. The at least three telescoping portions are normally in this case distributed over at least two different strips (they have to lie on different strip windings anyway, i.e. 360° turns, in order to be axially movable relative to one another).

According to another advantageous feature of the present invention, the strips of the stripwound hose have a cross sectional profile (as viewed in a longitudinal section of the stripwound hose) comprised of legs extending in parallel, perpendicular or slanted relation to the longitudinal hose axis. The telescoping portions are advantageously formed by parallel legs, whereas the interlocking connections between the telescoping portions are advantageously formed by radial or slanted legs.

According to another advantageous feature of the present invention, the strips may be coupled to one another by an agraffe connection.

According to another advantageous feature of the present invention, at least one of the strips can have an inner overlapping formation and/or outer overlapping formation.

To ensure clarity, it is necessary to establish the definition of several important terms and expressions that will be used throughout this disclosure. The term "overlapping formation" relates hereby to a leg which extends in substantial parallel relation to the hose axis in the longitudinal section of the stripwound hose and constitutes an end leg of the strip and which does not hook on to another strip along its extension length. The term "inner overlapping formation" relates to a disposition inside the stripwound hose. The term "outer overlapping formation" relates to a disposition on the outer side the stripwound hose. The overlapping formation may be aligned typically in steps or slightly slanted in relation to the hose axis so that neighboring overlapping formations may virtually superimpose one another in any scalelike manner.

The strips from which the stripwound hose is wound may be formed in a simplest case by a band-shaped structure of homogenous material.

According to another advantageous feature of the present invention, at least one of the strips may be made of several layers, i.e. of at least two layers of varying material and/or varying structure. As a result of such a multilayer configuration, the strip can be provided on its inner side and/or outer side with optimum properties. Advantageously, one of the layers may be a metallic strip layer and another one of the layers may be a thermally insulating strip layer. Suitably, the metallic strip layer is arranged to protect the thermally insulating strip layer, for example against attack from engine exhausts.

According to another advantageous feature of the present invention, strip windings of the stripwound hose can be connected at least in some areas by a solder material. The presence of the solder material prevents a relative movement of the connected strip windings so that the wound hose can be optionally configured in a rigid manner in certain spots, or sections, or over its entire length. Examples of a solder material include a high-temperature solder material which liquefies only at a temperature of typically more than 500° C. This ensures that the solder material remains solid during the common operating temperatures of a stripwound hose, as used in the exhaust system.

According to another aspect of the present invention, a conduit, in particular for an exhaust system of a motor vehicle, includes a stripwound hose expandable from a compressed state to a stretched state and being formed by at least two spiral-wound strips having at least three telescoping portions in a direction of a longitudinal axis, with the telescoping portions arranged in axially overlapping relation, when the stripwound hose assumes the compressed state, and extending in axial side-by-side relation, when the stripwound hose assumes the stretched state, wherein the telescoping portions are hooked to one another when being axially stretched.

The implementation of a conduit with a stripwound hose according to the invention can be made overall flexible when including besides the stripwound hose no other hose-like components, or when all components are also flexible. The substantial axial stretch of the stripwound hose provides such a flexible conduit with a high axial and lateral movement.

According to another advantageous feature of the present invention, the conduit may include at least one rigid pipe in coaxial relationship to the stripwound hose, either on the outside or the inside. As a result, the conduit can be made rigid. This applies also, when the conduit is curved. Furthermore, the initially flexible stripwound hose according to the present invention can be stiffened, for example by soldering strip windings to produce a rigid conduit.

In the presence of a rigid curved conduit, the radius of curvature may be configured optionally smaller than twice the diameter of the conduit. Advantageously, the radius of curvature may be smaller than the simple diameter of the conduit. Rigid curved pipes with such tight bending radii are oftentimes used in exhaust conduits to realize a compact configuration. Only the great stretching capability attainable by a stripwound hose according to the invention makes it possible to encase such pipes. The stretching capability and flexibility of a stripwound hose according to the present invention allows an encasing of bent conduits up to a currently desired bending radius of 1*D (bending radius=pipe diameter) so as to create the precondition for industrial application of insulations on rigid, bent exhaust pipes. Geometric considerations have shown that the stretch of a stripwound hose should be equal or greater than 100%.

In summary, a stripwound hose according to the present invention and a conduit which can be made flexible and rigid with a stripwound hose according to the present invention has the following optional properties:

The stripwound hose is made of at least two strips (profiles) of different geometry. In some applications, the provision of three, four, five or six strips may be appropriate.

The axial length of the stripwound hose, when compressed, is substantially defined by one of the used strips, whereas the axial length of the stripwound hose, when stretched, is substantially defined by all of the used strips.

The strips of the stripwound hose are singly hooked and the individual strip legs extend in axial and radial relation to the hose axis.

The strips of the stripwound hose are singly hooked, with some of the individual strip legs extending in axial relation to the hose axis, and with the remaining strip legs extending at an angle between 60° and 90° in relation to the hose axis.

The strips of the stripwound hose are singly hooked, or constructed as agraffe, or combinations of singly hooked profiles and agraffe profiles.

Some of the strips of the stripwound hose may have inner overlapping formations to ensure a fairly smooth inner surface, when the stripwound hose is stretched.

Some, of the strips of the stripwound hose may have outer overlapping formations to ensure a fairly smooth outer surface, when the stripwound hose is stretched.

At least one strip of the stripwound hose can be made of a single metallic strip layer.

At least one strip of the stripwound hose can be made of several metallic strip layers.

All of the strips of the stripwound hose can either be made of a strip layer or of several strip layers.

The strips of the stripwound hose can be made of several layers and only of metallic strip layers, or of metallic and thermally insulating strip layers.

The stripwound hose can be arranged on the outside or inside in an assembly with a rigid tube or a flexible conduit.

The stripwound hose can be arranged on the outside or inside in an assembly with straight or curved rigid conduits.

A profile or a strip layer of the stripwound hose can be made entirely or in part of a solder material so as to be formable into any curved shape and transferable into a rigid conduit after the subsequent soldering operation.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic illustration of a first strip of a stripwound hose according to the present invention;

FIG. 1a is a schematic illustration of a second strip of the stripwound hose;

FIG. 1b is a schematic illustration of a variation of the second strip of the stripwound hose;

FIG. 1c is a schematic illustration of the stripwound hose in compressed state;

FIG. 1d is a schematic illustration of the stripwound hose in stretched state;

FIG. 3 is a schematic illustration of a variation of a first strip for use in the formation of a stripwound hose according to the present invention;

FIG. 3a is a schematic illustration of the stripwound hose in compressed state, with the first strip of FIG. 3;

FIG. 3b is a schematic illustration of the stripwound hose of FIG. 3a in stretched state;

FIG. 4 is a schematic illustration of another variation of a first strip for use in the formation of a stripwound hose according to the present invention;

FIG. 4a is a schematic illustration of the stripwound hose in compressed state, with the first strip of FIG. 4;

FIG. 4b is a schematic illustration of the stripwound hose of FIG. 4a in stretched state;

FIG. 5 is a schematic illustration of yet another variation of a first strip for use in the formation of a stripwound hose according to the present invention;

FIG. 5a is a schematic illustration of a third strip for use in the formation of the stripwound hose of FIG. 5;

FIG. 5b is a schematic illustration of the stripwound hose in compressed state, with a combination of the first strip of FIG. 5, second strip of FIG. 1a, and third strip of FIG. 5a;

FIG. 5c is a schematic illustration of the stripwound hose of FIG. 5b in stretched state;

FIG. 6 is a schematic illustration of yet another variation of a first strip for use in the formation of a stripwound hose according to the present invention;

FIG. 6a is a schematic illustration of yet another variation of a second strip for use in the formation of the stripwound hose in combination with the first strip of FIG. 6;

FIG. 6b is a schematic illustration of the stripwound hose in compressed state, with a combination of the first strip of FIG. 6 and second strip of FIG. 6a;

FIG. 6c is a schematic illustration of the stripwound hose of FIG. 6b in stretched state;

FIG. 7 is a schematic illustration of a modification of the first strip of FIG. 6, with the strip being configured in many layers with an inner insulating layer and optionally with at least one of the outer strip layers being formed entirely or in part of a solder material;

FIG. 7a is a schematic illustration of a modification of the second strip of FIG. 6a;

FIG. 7b is a schematic illustration of the stripwound hose in compressed state, with a combination of the first strip of FIG. 7 and second strip of FIG. 7a;

FIG. 7c is a schematic illustration of the stripwound hose of FIG. 7b in stretched state;

FIG. 8 is a schematic illustration of another variation of a first strip for use in the formation of a stripwound hose according to the present invention;

FIG. 8a is a schematic illustration of another variation of the second strip for use in the formation of the stripwound hose in combination with the first strip of FIG. 8;

FIG. 8b is a schematic illustration of the stripwound hose in compressed state, with a combination of the first strip of FIG. 8 and second strip of FIG. 8a;

FIG. 8c is a schematic illustration of the stripwound hose of FIG. 8b in stretched state.

DETAILED DESCRIPTION OF PREFERRED EMBODIMENTS

Figure 2:
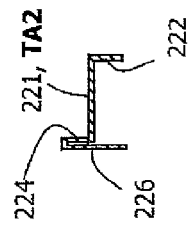
FIG. 2 is a schematic illustration of a variation of a second strip for use in the formation of a stripwound hose according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The exemplary embodiments illustrated in the figures relate to a stripwound hose which is made by spiral-winding profiled strip material in several layers with hooked or agraffe (interlock) connection of winding layers.

Turning now to the drawing, and in particular to FIGS. 1 and 1a, there are shown schematic illustrations of two differently pre-profiled metal strips 110 and 120, respectively, of a stripwound hose 100. The first strip 110, shown in FIG. 1a, having a profile of a conventional, singly hooked hose. The S-shaped contour of the strip 110 is realized by the legs 112, 114, 116 extending in radial relationship to the longitudinal hose axis X (FIGS. 1d and 1e), with radial leg 116 positioned on the left-hand side of the strip 110, radial leg 114 in midsection, and radial leg 112 positioned on the right-hand side of the strip 110. The total of the lengths of the radial leg 116 and radial leg 112 corresponds approximately to the length of the central radial leg 114. The radial leg 116 is connected to the radial leg 114 by an inner leg 113 which extends in axial direction, i.e. in parallel relation to the hose axis X. The connection between the radial leg 114 and the radial leg 112 is realized by an outer axial leg 111. For reasons more clearly apparent from the following description, the outer and inner axial legs 111, 113 will be designated in the following description also as "first telescoping portion" TA1 and "third telescoping portion" TA3, respectively.

As the conventional profile of a singly hooked hose that could be formed with the strip 110 is limited to a stretching of significantly less than 100% for physical and plausibility reasons, the configuration is expanded with the addition of the profiled second strip 120, as shown in FIG. 1b. The second strip 120 has a left-hand radial leg 126 which is immediately followed by a radial leg 124 to form a 180° sheet metal fold. On the right-hand side, the strip 120 includes a radially inwardly projecting leg 122 which is connected to the radial leg 124 by an axial leg 121. The axial leg 121 will be designated in the following description as "second telescoping portion" TA2.

FIG. 1b shows a schematic illustration of a variation of the second strip, generally designated by reference numeral 120b. In the following description, parts corresponding with those in FIG. 1a will be identified, where appropriate for the understanding of the invention, by corresponding reference numerals followed by a "b". In this embodiment, the outwardly projecting radial leg 124b on the left hand side has a radial dimension which is half of the radial extension of the left-hand legs 124, 126 of the strip 120 of FIG. 1a. In other words, the sheet metal fold and the lower radial portion of the leg 126 are eliminated. The geometry of the strip 120b is simple. The strip 120b includes in addition to the left radial leg 124b a radially inwardly directed right-hand leg 122b which is connected to the radial leg 124b by the axial leg 121b.

Either one of the strips 120 and 120b can be combined with the strip 110 to form a metal hose wound of two different pre-profiled strips 110 and 120 or 110 and 120b, and having a stretching capability of significantly greater than 100%. This is clearly also illustrated by the comparison between the compressed state of the metal hose 100, as shown in FIG. 1c, and the stretched state thereof, as shown in FIG. 1d, whereby in this example the hose 100 is composed of strips 110 and 120.

The substantial stretching capability is realized by an effect resembling a telescope. When the stripwound hose 100 is compressed, as shown in FIG. 1c, the three telescoping portions TA1, TA2, TA3 of the strips 110, 120 are arranged in axial overlapping disposition. In the stretched state, the three telescoping portions TA1, TA2, TA3 of the strips 110, 120 are arranged in axial succession, as shown in FIG. 1d. Disregarding the slight axial thickness of the radial legs 112, 114, 116, 122, 124, 126, the telescoping portions TA1, TA2, TA3 are substantially of same axial length. The axial extension of a period length of the stripwound hose 100 is thus approximately the same length of a telescoping portion in the compressed state and the same length of three telescoping portions in the stretched state.

In other words, the axial dimension of the stripwound hose 100 in the compressed state corresponds to the total of the axial lengths of the strip 110. The axial length of the second strip 120 is composed of the total of the axial lengths of its legs 121, 122, 124, 126. In the compressed state, this total corresponds to the total of the axial lengths of the legs 111 and 112. As a result, the strip 120 is bounded on the left-hand side by the leg 114 and located beneath the legs 111, 112 of the strip 110. The strip 120 does therefore not add to the axial length, when the stripwound hose 100 is compressed. This is clearly shown also in FIG. 1c. In the telescoping stretched state of the stripwound hose 100, the total stretch lengthens essentially by the axial dimension of the telescoping portion TA2.

Figure 2A:
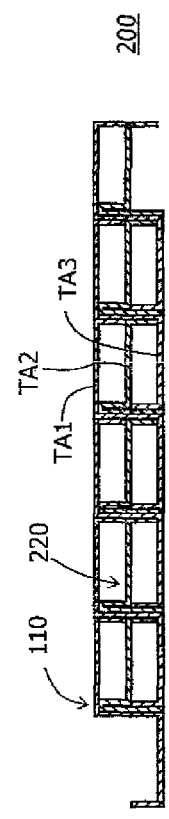
FIG. 2a is a schematic illustration of the stripwound hose in compressed state, with the second strip of FIG. 2.
Figure 2B:
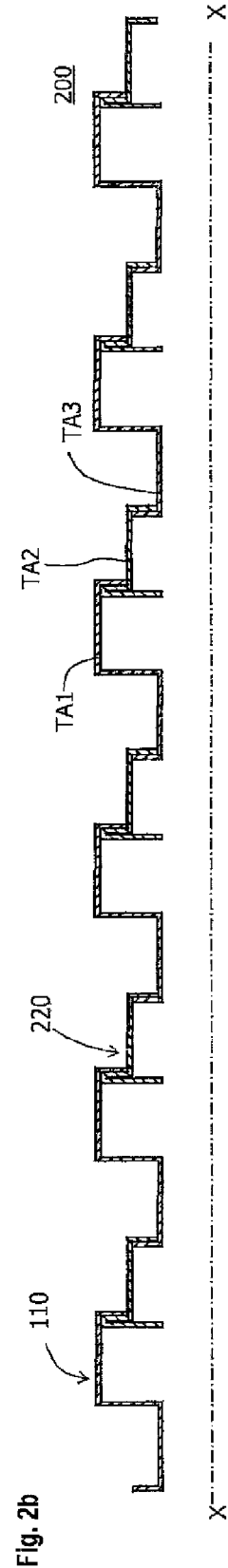
FIG. 2b is a schematic illustration of the stripwound hose of FIG. 2a in stretched state.

Turning now to FIG. 2, there is shown a variation of a second strip, generally designated by reference numeral 220, for use in the formation of a stripwound hose according to the present invention, generally designated by reference numeral 200. In the following description, parts corresponding with those in FIG. 1a will be identified, where appropriate for the understanding of the invention, by corresponding reference numerals each increased by "100". The stripwound hose 200 is formed by the first strip 110, shown in FIG. 1, in the form of the singly hooked profile, and the strip 220 which differs from the strip 120 of FIG. 1a in that the sheet metal fold between the radial legs 224 and 226 is now located radially on the outside. The compressed state of the stripwound hose 200, shown in FIG. 2a, and the stretched state of the stripwound hose 200, shown in FIG. 2b, show the same stretch values as the stripwound hose 100.

FIG. 3 shows a variation of a first strip, generally designated by reference numeral 310, for use in the formation of a stripwound hose according to the present invention, generally designated by reference numeral 300. In the following description, parts corresponding with those in FIG. 1 will be identified, where appropriate for the understanding of the invention, by corresponding reference numerals each increased by "200". The stripwound hose 300 is formed by the strip 220, shown in FIG. 2 and the strip 310 which is configured to expand the hooked profile of the strip 110 of FIG. 1. The strip 310 includes legs 311, 312, 313, 314, 316 in a configuration corresponding to the configuration of the profile of strip 110. On the left-hand side, the radial leg 316 of the strip 310 is formed with a radial sheet metal fold with adjoining inner overlapping formation 315. The inner overlapping formation 315 is formed by a first axial inner leg 315a, a radial leg 315b of a length corresponding to a sheet metal thickness, and a second axial inner leg 315c. The adjoined inner overlapping formation 315 ensures in approximation a smooth inner surface of the stripwound hose 300 in the stretched state. Furthermore, the provision of the inner overlapping formation 315 results in the presence of hollow chambers HK1, HK2, when the stripwound hose 300 is expanded, as shown in FIG. 3b, in order to enhance the insulation effect. When the stripwound hose 300 assumes the compressed state, as shown in FIG. 3a, the inner overlapping formation 315 does not add to the overall axial length.

FIG. 4 shows another variation of a first strip, generally designated by reference numeral 410, for use in the formation of a stripwound hose according to the present invention, generally designated by reference numeral 400. In the following description, parts corresponding with those in FIG. 3 will be identified, where appropriate for the understanding of the invention, by corresponding reference numerals each increased by "100". The stripwound hose 400 is formed by the strip 220, shown in FIG. 2 and the strip 410 which is configured to expand the profile of the strip 310 of FIG. 3. The strip 410 includes legs 411, 412, 413, 414, 416 and the inner overlapping formation 415 in a configuration corresponding to the configuration of the profile of strip 310. On the right-hand side, the radial leg 412 of the strip 410 is directly formed with an inwardly directed radial sheet metal fold with adjoining outer overlapping formation 417. The outer overlapping formation 417 is formed by a first axial outer leg 417a, a radial leg 417b of a length corresponding to a sheet metal thickness, and a second axial outer leg 417c. The adjoined outer overlapping formation 417 also does not add to the overall axial length of the stripwound hose 400 in the compressed state thereof (FIG. 4a), and ensures in approximation a smooth outer surface of the stripwound hose 400 in the stretched state (FIG. 4b). Furthermore, the provision of the outer overlapping formation 417 results in the presence of an additional hollow chamber HK3, when the stripwound hose 400 is expanded to enhance the insulation effect.

FIG. 5 shows a schematic illustration of yet another variation of a first strip, generally designated by reference numeral 510 in combination with the profile of the second strip 120, and a third strip 530, for formation of a stripwound hose according to the present invention, generally designated by reference numeral 500. The strips 510, 120, 530 are pre-profiled differently. The strip 510 includes an axial leg 511, representing the first telescoping portion TA1, with adjoining inwardly pointing radial legs 512 and 514 of different lengths. The second strip 120 includes the second telescoping portion TA2. The third strip 530 includes an axial leg 531, representing the third telescoping portion TA3, with adjoining outwardly pointing radial legs 532 and 534 of same length. The telescoping portions TA1, TA2, and TA3 which are thus spread over the three different strips 510, 120, 530, overlap in the compressed state of the stripwound hose 500 (FIG. 5b) and extend side-by-side in the stretched state of the stripwound hose 500 (FIG. 5c). The compressed profile geometry and the stretched profile geometry illustrate that the stretch values are comparable to those in the afore-described profile configurations and lie in any event above 100%.

FIG. 6 shows a schematic illustration of yet another variation of a first strip, generally designated by reference numeral 610 in combination with a second strip 620, shown in FIG. 6a, for formation of a stripwound hose according to the present invention, generally designated by reference numeral 600. A comparison between the profile of the strip 610 with the profile of the strip 110 of FIG. 1 illustrates that the radial legs 616 and 612 on the left-hand and right-hand profile margins, respectively, do not extend at a right angle in relation to the rotation axis X. Rather, the left-hand radial leg 616 of the stripwound hose 600 extends in relation to the rotation axis X at an angle a in the range between 60° and 90°. The radial leg 622 of the second strip 620 extends opposite to the radial leg 616 in parallel relationship thereto to attain a greatest possible contact surface, when the stripwound hose 600 is stretched from the compressed state shown in FIG. 6b into the stretched state shown in FIG. 6c.

The radial leg 612 extends in relation to the rotation axis X at an angle β in the range between 60° and 90°. The upper radial leg 622 on the right-hand side of the second strip 620 extends opposite to the radial leg 612 in parallel relationship thereto to attain a greatest possible contact surface in the stretched state of the stripwound hose 600.

The illustrated angular disposition of the radial legs 612, 616 and 622, 626 of the first and second strips 610 and 620, respectively, is, of course, applicable in all profiles of the afore-described strips because of the positive effect on the strength. Stretching of the stripwound hose is not limited by the angular disposition, as a comparison between FIGS. 6b and 6c illustrates.

FIGS. 7, 7a, 7b, 7c illustrate the formation of a stripwound hose according to the invention, generally designated by reference numeral 700 and having a geometry corresponding to a geometry as shown in FIGS. 6, 6a, 6b, 6c, with a difference residing in the multi-layer configuration of the strips 710, 720, shown in FIGS. 7 and 7a, respectively. By way of example, the strip 710, shown in FIG. 7, is comprised of three layers 710a, 710b, 710c, with the outer layers 710a, 710c being made of metal. The mid-layer 710b is a thermally insulated strip layer. The second strip 720, shown in FIG. 7a, has also outer layers 720a, 720c of metal, with the central strip layer 720b having insulating property. Of course, any combination of strips with and without insulating strip layers is possible.

At least one of the outer layers 710a, 710c, 720a, 720c can be made entirely or in part of a solder material. The stripwound hose 700 with integrated solder material can then be bend in any desired curved shape during a following fabrication step. A following thermal treatment, for example in a soldering furnace with inert atmosphere, transforms the initially stretchable stripwound hose into a rigid, curved conduit.

In addition to the afore-described singly hooked stripwound hoses, strip configurations with agraffe profiles are also conceivable to attain a significantly increased stretch. An example of such a stripwound hose is illustrated in FIGS. 8b and 8c and designated by reference numeral 800. The stripwound hose 800 is formed with a first agraffe profiled strip 810, shown in FIG. 8, and a second agraffe profiled strip 820, shown in FIG. 8a. The strip 810 differs from the first strip 110 of FIG. 1 essentially in that the terminal radial legs 816 and 812 are continued by axial legs 813a and 811a, respectively, which point in a direction of the strip center and extend in parallel relationship to the axial legs 813, 811 by about half their length. Likewise, the strip 820 differs from the second strip 120c of FIG. 1b essentially in that the terminal radial legs 824 and 822 are continued by axial legs 821a and 821b, respectively, which point in a direction of the strip center and extend in parallel relationship to the axial legs 821 by about half its length on its outer side and inner side, respectively.

Figure 9:
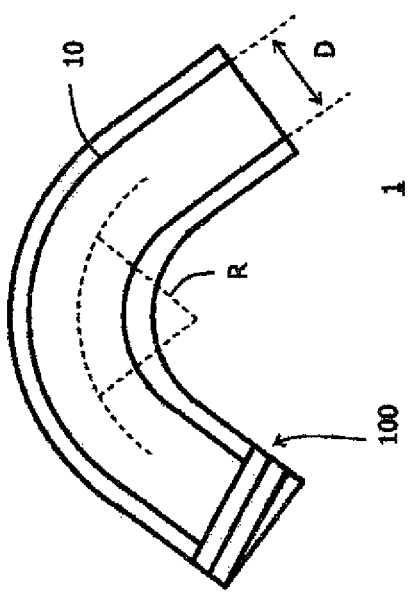
FIG. 9 is a schematic illustration of a conduit equipped with a stripwound hose according to the present invention.

Turning now to FIG. 9, there is shown a schematic illustration of a conduit, generally designated by reference numeral 1 and equipped with a stripwound hose according to the present invention, such as for example the stripwound hose 100. The conduit 1 includes an inner pipe 10 which is suitably made rigid and curved at a tight bending radius R which is about the same as the diameter D of the pipe 10. As a result of its great stretching capability, the stripwound hose 100 is able to conform to this tight curvature to thereby establish a thermally insulating air gap about the pipe 10.

As described above, all exemplary embodiments of the illustrated strips can be made for improving the insulating effect of several metallic and non-metallic strip layers which are spiral-wound to one another. The insulating strip layers are suitably arranged in the center of a multi-layered composite. An example of the manner to arrange strip layers in the center of a multi-layered composite is fully described in unpublished German patent application DE 10 2009 040 072.9, the entire specification and drawings of which are expressly incorporated herein by reference.

Common to all embodiments of a stripwound hose according to the invention is the fact that the stripwound hose can be made of several, at least two different strips, with one of both strips moving in a telescoping manner into the other one of the strips, when the stripwound hose assumes the compressed state so that the length of the stripwound hose, when compressed, is defined by a single strip, and defined by both strips, when stretched.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated. Of course, any number and any combinations of afore-described strip profiles to produce a stripwound hose according to the present invention are conceivable.

What is claimed as new and desired to be protected by Letters Patent is set forth in the appended claims and includes equivalents of the elements recited therein:

What is claimed is:

1. A stripwound hose expandable from a compressed state to a stretched state, comprising at least two spiral-wound strips having at least three telescoping portions in a direction of a longitudinal axis, said three telescoping portions are all arranged over one another in axially overlapping relation, when the stripwound hose assumes the compressed state, and extending in axial side-by-side relation, when the stripwound hose assumes the stretched state, wherein the telescoping portions are hooked to one another when being axially stretched, wherein the two strips have different cross sectional profiles, wherein at least one strip has an S-shaped contour including a first radial leg, a second radial leg in midsection, and a third radial leg, wherein the first radial leg is connected to the second radial leg by an inner leg which extends in axial direction, and wherein the second radial leg and the third radial leg are connected by an outer axial leg.

2. The stripwound hose of claim 1, wherein the strips have a cross sectional profile comprised of legs extending in parallel, perpendicular or slanted relation to the longitudinal axis.

3. The stripwound hose of claim 1, wherein the strips have an agraffe profile.

4. The stripwound hose of claim 1, wherein at least one of the strips has an inner overlapping formation and/or outer overlapping formation.

5. The stripwound hose of claim 1, wherein at least one of the strips has several layers.

6. The stripwound hose of claim 5, wherein one of the layers is a metallic strip layer and another one of the layers is a thermally insulating strip layer.

7. The stripwound hose of claim 1, wherein strip windings are connected at least in some areas by a solder material.

8. The stripwound hose of claim 1, wherein the telescoping portions are substantially of same axial length.

9. A conduit, in particular for an exhaust system of a motor vehicle, comprising a stripwound hose expandable from a compressed state to a stretched state, comprising at least two spiral-wound strips having at least three telescoping portions in a direction of a longitudinal axis, said three telescoping portions are all arranged over one another in axially overlapping relation, when the wound hose assumes the compressed state, and extending in axial side-by-side relation, when the wound hose assumes the stretched state, wherein the telescoping portions are locked to one another in the stretched state, wherein the two strips have different cross sectional profiles, wherein at least one strip has an S-shaped contour including a first radial leg, a second radial leg in midsection, and a third radial leg, wherein the first radial leg is connected to the second radial leg by an inner leg which extends in axial direction, and wherein the second radial leg and the third radial leg are connected by an outer axial leg.

10. The conduit of claim 9, wherein the strips have a cross sectional profile comprised of legs extending in parallel, perpendicular or slanted relation to the longitudinal axis.

11. The conduit of claim 9, wherein the strips have an agraffe profile.

12. The conduit of claim 9, wherein at least one of the strips has an inner overlapping formation and/or outer overlapping formation.

13. The conduit of claim 9, wherein at least one of the strips has several layers.

14. The conduit of claim 13, wherein one of the layers is a metallic strip layer and another one of the layers is a thermally insulating strip layer.

15. The conduit of claim 9, wherein strip windings are connected at least in some areas by a solder material.

16. The conduit of claim 9, further comprising at least one rigid pipe in coaxial relationship to the stripwound hose.

17. The conduit of claim 16, wherein the pipe has a bend.

18. The conduit of claim 17, wherein the pipe is defined by a diameter, said bend having a radius of curvature which is smaller than twice the diameter of the pipe.

19. The conduit of claim 17, wherein the pipe is defined by a diameter, said bend having a radius of curvature which is smaller than the diameter of the pipe.

20. The conduit of claim 9, wherein the telescoping portion are substantially of same axial length.

* * * * *